Patented Feb. 28, 1933

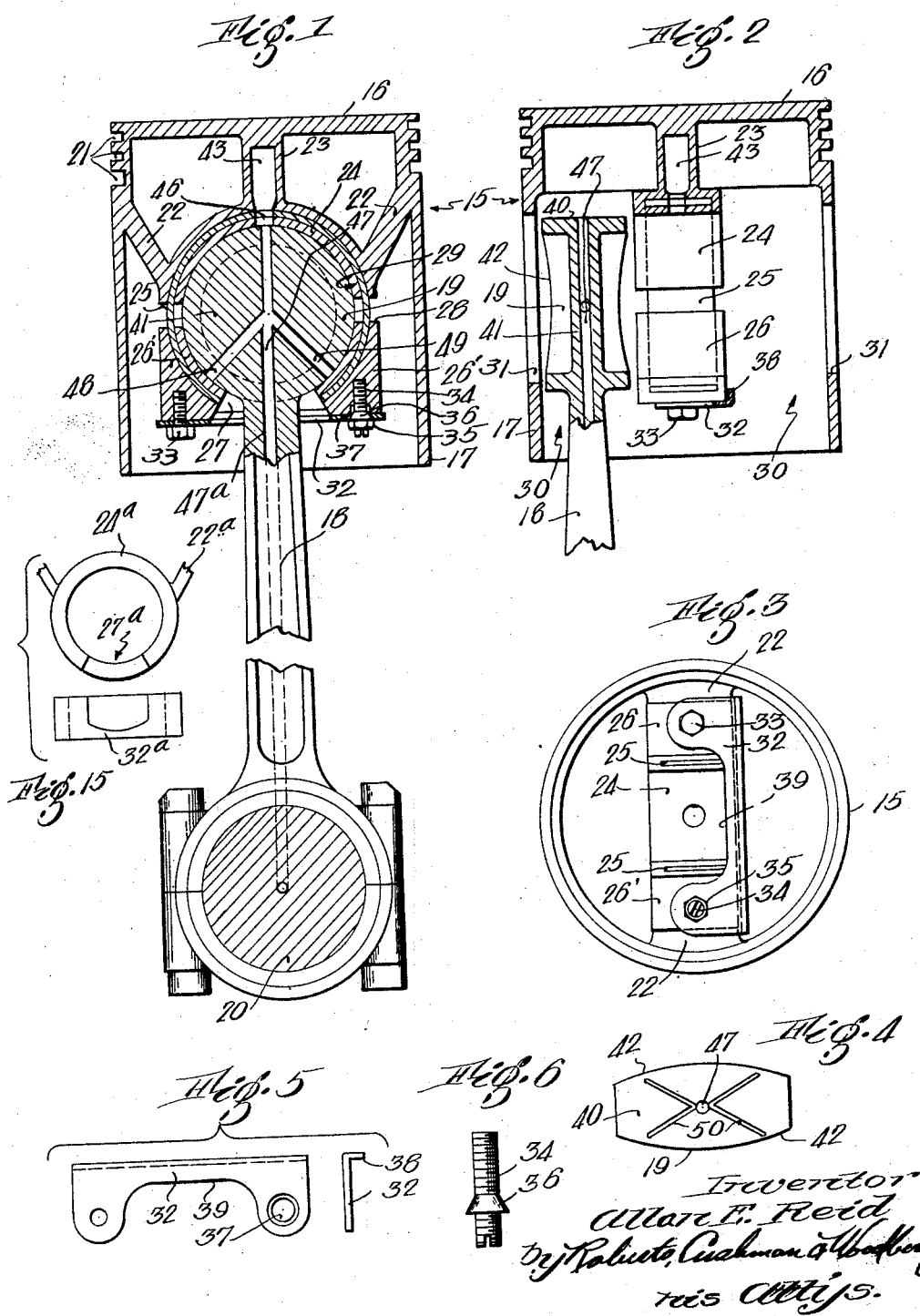

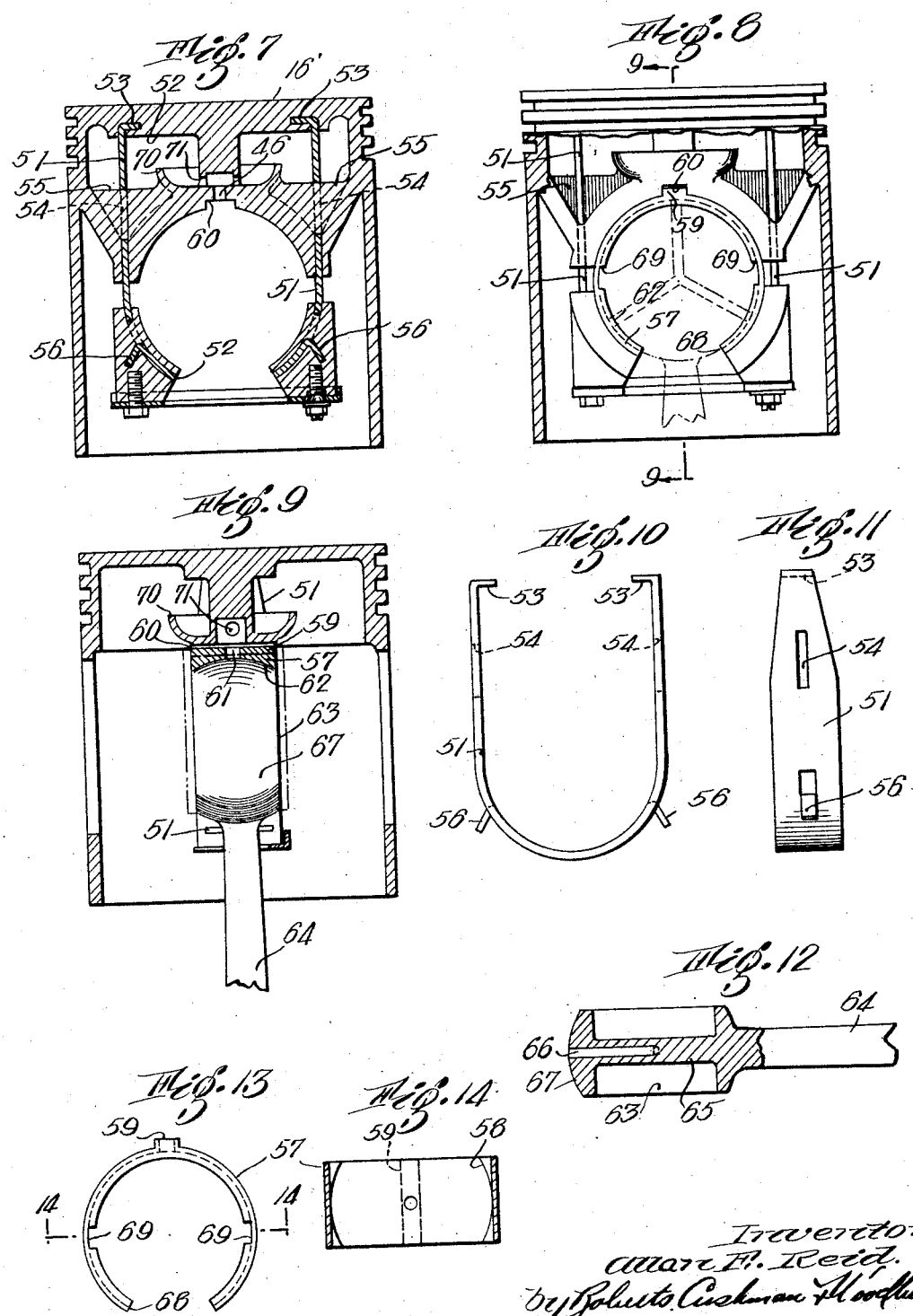

1,899,355

UNITED STATES PATENT OFFICE

ALLAN E. REID, OF BOSTON, MASSACHUSETTS, ASSIGNOR TO REID PISTON COMPANY, OF BROOKLINE, MASSACHUSETTS, A CORPORATION OF MASSACHUSETTS

PISTON AND CONNECTING ROD

Application filed May 20, 1930, Serial No. 453,997. Renewed July 1, 1932.

This invention relates to pistons and connecting rods of the type in which the connecting rod transmits motion from the piston to the crank shaft without the interposition of a piston rod and cross head, and in which the piston has a hollow body or skirt portion into which one end of the connecting rod projects. Such pistons are commonly known as "trunk" pistons and while they are usually employed in automobile engines, they are beneficially used in internal combustion engines generally and also may be employed in thermal motors of other types as well as in pumps, air compressors, and the like.

In the present state of development of internal combustion engines, particularly those employed in automobiles, the association of several important features of construction and arrangement of the piston and its connecting rod have been recognized as highly desirable, but a satisfactory combination of the desired features has been difficult to attain in commercial practice. Among these features may be mentioned the following:— The piston should be of relatively small size, yet the joint between the piston and connecting rod should have a relatively large bearing surface; as the bearing surfaces are thus increased, especial provision must be made for adequately lubricating its entire surface in order to avoid excessive wear with loosening of the connected members; for most efficient operation the force of the exploded fuel should be delivered through the piston to the connecting rod in a direct line axially of the piston and with a minimum of relatively movable connections between the connecting rod and the piston head which receives the propulsive impulse; the piston bearing should be adjustable to compensate for such wear as does occur; the connections should be so arranged that the connecting rod may be applied and the necessary adjustments effected without removing the piston from the cylinder; and the piston should be light in weight yet durable and its lower or skirt portion free from internal struts to ensure a constant symmetrical form and to avoid unequal stresses and unequal wear between this part of the piston and the cylinder wall.

As most of these features were absent from the commercial apparatus theretofore available, particularly in the common type of "trunk" piston in which the connecting rod is journaled upon an independent wrist pin of small diameter, which has bearings in hubs at the opposite sides of the hollow piston, I have heretofore invented improved forms of connection between the piston and connecting rods, some of which I have described in applications for Letters Patent, particularly in my application resulting in Patent No. 1,756,211, dated April 29, 1930. While my said constructions are generally satisfactory, I recognize the need for further improvement in the mode of application of the aforesaid desirable features and in their relative co-ordination.

I have accordingly devised an improved bearing of large size comprising parts formed integrally with the piston and having a core of spring metal which allows portions of the bearing to be readily contracted or expanded; I have provided improved means for adjusting the diameter of the bearing without removing the piston from its cylinder; I have also afforded adequate means for lubricating the bearing; and I have provided other structural features which will be hereinafter described and pointed out in the appended claims.

Recommended embodiments of my present invention are illustrated in the accompanying drawings, in which:

Fig. 1 is a vertical section of one desirable form of piston and connecting rod constructed and arranged in accordance with this invention;

Fig. 2 is a vertical section at right angles to Fig. 1, showing the preferred mode of applying the detachable connecting rod;

Fig. 3 is a bottom view of the piston with the connecting rod removed;

Fig. 4 is a face view of the upper end of the connecting rod;

Fig. 5 is a composite view of a bridge member used for adjusting the diameter of the piston bearing;

Fig. 6 is a detail view of the adjusting screw;

Fig. 7 is a vertical section through a modified form of piston, the connecting rod being removed;

Fig. 8 is a view similar to Fig. 7, with certain parts in elevation and including the provision of an interior ring within the piston bearing;

Fig. 9 is a section on line 9—9 of Fig. 8, showing the connecting rod applied to the piston;

Figs. 10 and 11 are side and end views respectively of a spring metal member prior to its incorporation in the piston of Figs. 7 to 9;

Fig. 12 is a central section through the head of the connecting rod shown in Fig. 9;

Fig. 13 is a side view of the interior ring shown in Figs. 8 and 9;

Fig. 14 is a section on line 14—14 of Fig. 13; and

Fig. 15 is a composite view, showing in elevation and bottom plan, a modified type of bearing.

In the particular embodiment chosen for the purpose of illustration in Figs. 1 to 6, I have shown a piston 15 having a head 16 and a depending skirt portion 17, and a connecting rod 18 having a pivot head 19, preferably integral therewith, journaled within the piston bearing and having its lower end journaled in the usual manner upon a crank shaft 20. The cylindrical piston may be made of any suitable material, for example cast iron or aluminum, and is adapted to reciprocate within the engine cylinder (not shown) in accordance with common practice; and it may have the customary peripheral grooves 21 for the reception of packing rings.

The upper portion of the piston 15 is provided with relatively narrow, diametrically disposed, supporting webs 22 and an axial supporting member 23, and these supports carry the upper part 24 of the piston bearing, these parts preferably being integral and the bearing preferably having a disk-like, annular form. A flat sided ring 25 of spring metal, such as tempered steel, is cast concentrically in the bearing portion 24, and the two-part lower portion 26, 26′ of the piston bearing is cast about the lower or outer portion of the ring 25. The aforesaid parts of the piston may be cast as a unit, and the lower central portion of the bearing member and ring may be cut away at 27 so as to separate the parts 26 and 26′ and thus allow for the reception and oscillation of the connecting rod. The flexible spring member 25 accordingly constitutes a spring core incorporated within the composite bearing element and, as the bearing members 24 and 26 are separated from each other at 28, on opposite sides of the bearing, the divided portions 26 and 26′ of the bearing which are connected to the upper member 24 by said spring member, may be contracted or expanded to vary the diameter of the transverse opening 29.

It will be observed that transverse opening 29 is of substantial diameter as compared with the diameter of the piston, and the disk-like piston bearing is preferably disposed axially of the piston and is relatively narrow in order to provide open chambers or spaces, indicated at 30 (Fig. 2), at opposite sides thereof, which are adapted to admit the pivot head 19 of the connecting rod as hereinafter described. The transverse opening is preferably cylindrical and may be machined to proper size through openings 31 which may be provided at opposite sides of the piston skirt, the term "cylindrical" as just used being inclusive of tapered openings.

In order easily to adjust the diameter of the transverse opening 29, a bridge member 32 is connected across the lower faces of the divided portions 26 and 26′ of the lower bearing. Although the connection and adjustment may be effected in several satisfactory modes, I prefer to attach one end of the bridge to the member 26 as by a bolt 33, and adjustably to fasten the opposite end of the bridge to the member 26′ by means of an adjusting screw 34 and lock nut 35. The screw preferably has a conical collar 36 integral therewith which cooperates with a complemental, preferably conical opening 37 of larger diameter in the bridge 32, to provide relative longitudinal adjustment between the bridge and the face of the bearing member 26. Hence, when the screw 34 is threaded through the opening 37 and into a complemental aperture in said bearing portion, the member 26′ is moved toward the member 26 by reason of the engagement of the conical collar with the outer side of said opening, and the diameter of the transverse opening 29 is accordingly decreased. It is evident that this operation opposes the action of the spring 25 which tends to keep the transverse opening at its maximum diameter. Such adjustment may be readily effected, without removing the piston from the cylinder, by loosening the lock nut 35 and turning the screw 34 by means of a screw driver.

The bridge 32 may have an upstanding flange or lip 38 along one edge which abuts against corresponding sides of the lower bearing member 26 and 26′ and maintains them in proper alignment; and the opposite side of the bridge is preferably cut away centrally to provide a recess 39 for receiving the connecting rod. The connecting rod may thus be applied to the piston bearing without detaching the bridge member, the adjusting screw being loosened to permit easy insertion of the pivot head 19 into the journal opening 29.

The pivot head of the piston is substantially disk-shaped and its periphery is machined to proper cylindrical contour for reception and oscillation within the transverse opening, and to provide a suitable wear surface 40 for engagement with the piston bearing.

The head 19 is preferably integral with the connecting rod 18 and its annular bearing surface is preferably reinforced by a transverse web 41. In assembling the piston and connecting rod, the pivot end of the rod is moved into the space 30 between the piston bearing and the piston wall until the axis of the pivot head 19 is aligned with the axis of the transverse opening 29, as shown in Fig. 2. The connecting rod is then moved bodily to engage the pivot head in said opening, the rod 18 entering the opening 27 between the divided portions of the lower piston bearing and being received in the recess 39 of the bridge member. To prevent binding at the opposed edges of the piston bearing and pivot head during the insertion, the sides of the pivot head may be cut away as shown at 42.

It is apparent that the connecting rod may be applied or removed in the aforesaid manner without removing the piston from the engine cylinder, the lower end of the rod being separated from the crank shaft 20 during said operations. The adjusting screw is regulated properly to tighten the piston bearing about the pivot head by a screw driver as aforesaid, and subsequent adjustments may be made when desired, to compensate for wear between the bearing surfaces.

In order to afford proper lubrication of the piston bearing, the axial support 23 is preferably provided with a cavity 43 constituting a recess which communicates through registering openings 46 in the upper bearing portion 24 and ring 25, with the transverse opening 29. The web 41 of the pivot head 19 preferably has radial ports 47, 48, and 49 leading from its axis to the periphery of the head. The port 47 forms a continuation of an oil passage 47ª extending throughout the length of the connecting rod and through which oil is forced by the usual oil pump, not shown, while ports 48 and 49 lead respectively from port 47 to the divided portions 26 and 26′ of the lower bearing member. Oil grooves 50 leading from the opening 46 may be provided on the upper face of the piston head (Fig. 4). It will be noted that the ports 48 and 49 lead to the respective portions of the lower bearing member, which are most subject to excessive wear after tightening of the bearing element.

In the modification shown in Fig. 7, the piston construction is in most respects similar to that illustrated in the preceding figures, but the spring member is substantially U-shaped (Figs. 10 and 11) instead of ring-shaped. The U-shaped spring 51 is cast in the piston and around the piston bearing in the manner previously indicated, the bottom portion of the spring being cut away at 52 when the bearing is made ready for reception of the connecting rod. In this instance, the head 16′ of the piston has a thickened portion or rib 52′ in which are embedded inwardly bent ends 53 of the spring member 51 to anchor the upper portions of said member. The legs of the spring may also have openings or slots 54 through which the piston metal may flow to form strengthening webs 55 above the piston bearing; and the lower portions of the divided spring member preferably have struck-out tongues 56 anchored in the divided portions of the lower bearing member.

As illustrated in Figs. 7, 8, and 9, the bearing member is provided with a basin 70 to collect oil for splash lubrication, the oil collected by the basin passing through ports 71 to opening 46 like that shown in Fig. 1. In this case the connecting rod is without the channel 47ª, but the pivot member has passages corresponding to the passages 47, 48, and 49 (and 50 also if desired) of Fig. 1 to convey the oil to the bearing surfaces. Obviously the basin 70 might, if desired, be used in connection with the force-feed arrangement shown in Fig. 1 with the provision, if necessary, of a check valve or the like to prevent ejection of oil outwardly into the basin.

The piston of Fig. 7 is accordingly adapted for use with the connecting rod 18 previously described, but its piston bearing preferably comprises an inner ring constructed to accommodate a connecting rod having a pivot head formed with a periphery of toroidal contour, in order to permit universal movement of the connecting rod. Such a preferred arrangement is illustrated in Figs. 8 to 14, it being understood that the piston and connecting rod are generally similar to those heretofore explained except for the particular features now to be described.

The piston of Figs. 8 and 9 has the U-shaped spring member 51 of Figs. 7, 10, and 11, as well as the upper and lower bearing members and adjusting bridge mentioned above. Fitted within the piston bearing is a divided ring 57, shown in detail in Figs. 13 and 14, which has an inner surface 58 arcuate or spherical in cross-section and which is also provided with an external transverse key 59 at its upper portion, the key sliding in a complemental keyway 60 in the upper bearing member. This splined connection allows the ring 57 to slide in an axial direction relative to the bearing. An oil port 61, extending through the key 59 to the inner journal opening 62 leads to the communicating passages of the bearing element as described above.

The pivot head 63 of the connecting rod 64 which is adapted for use with this preferred form of bearing is provided with an axial web 65 having radial oil ports such as above described, one of the ports being shown at 66 (Fig. 12). The pivot head is flat-sided or disk-like as heretofore explained, but its outer bearing surface 67 is spherical in curvature, rather than cylindrical as above, to fit the complemental surface of the ring 57, and to permit universal movement of the connecting rod. Because of the splined connection between the fixed portion of the piston bearing and its movable inner ring; the connecting rod may also move bodily in a direction transversely to its plane of oscillation together with the ring 57, as indicated by the broken lines of Fig. 9, to accommodate axial play of the journaled lower end of the rod upon the crank shaft.

It will be observed that the ring 57 is divided at its bottom portion, as shown at 68, to provide a port registering with the opening 52 in the spring member, and the corresponding opening between the lower bearing portions, so that the connecting rod 64 may oscillate therein. The diameter of the journal opening 62 may be adjusted by means of the bridge member above set forth; and the ring 57 may have slots 69 disposed adjacent the spaces between the upper and lower members of the piston bearing element, to afford sufficient flexibility of the ring during such adjustment.

In Fig. 15 I have illustrated the modified form of bearing 24ª having the bracing webs 22ª and the gap 27ª for the passage of the connecting rod, the ends of the gap being united by a rigid bridge member 32ª integral with the bearing.

While the foregoing description represents several desirable embodiments of my invention, it will be understood that structural details may be varied to suit particular purposes without departing from the cardinal features of construction and arrangement or from the essence of the invention as defined in the following claims.

I claim:

1. The combination of a piston having a head, a skirt portion, and a bearing spaced from the head, said bearing comprising substantially rigid elements united by resilient members and defining a journal opening, and a connecting rod having a head at one end adapted to fit within the journal opening in said bearing.

2. The combination of a piston comprising a head and a skirt portion and an internal bearing spaced from the inner surface of the head and having a cylindrical journal opening, said bearing comprising substantially rigid portions united by resilient elements, and a connecting rod having an integral, cylindrical pivot member adapted to fit within said journal opening.

3. The combination of a piston with a connecting rod, the piston having a slit annular resilient bearing providing a journal opening whose axis is transverse to the axis of the piston, said bearing comprising substantially rigid parts united by resilient elements, a connecting rod having an integral portion constituting a pivot member seating in said journal opening, a bridge member uniting spaced rigid parts of the annular bearing, and means for varying the effective length of the bridge member.

4. In combination with a trunk piston of the kind having a head, a skirt portion, and a bearing member beneath the head and within the skirt portion, said bearing member comprising a rigid upper portion defining substantially one-half of a cylindrical opening, spaced lower members each defining another portion of said opening, resilient means connecting said lower members to the upper member, a connecting rod having a pivot member disposed within said opening, and a bridge connecting the spaced lower members of the bearing, said bridge having a recess to accommodate the connecting rod.

5. The combination of a piston with a connecting rod, the piston having a resilient annular bearing providing a journal opening whose axis is transverse to the axis of the piston, said bearing having a gap at one point, the connecting rod having an integral head constituting a pivot member seating in said journal opening, a bridge member connecting opposite portions of the bearing and extending across the gap, and a screw having a conical portion engaging the bridge member and adapted to vary the effective length of the bridge member.

6. The combination of a piston with a connecting rod, the piston comprising a bearing element spaced from the inner surface of the piston, said bearing element having a transverse opening and comprising upper and lower members spaced from each other, the lower member being divided to provide separate members movable relatively to each other for varying the diameter of the opening, a flexible element incorporated in the bearing element and connecting the lower bearing members with the upper bearing member, and means connecting the lower bearing members for adjusting the diameter of said transverse opening, the connecting rod having a pivot head adapted to enter the opening.

7. The combination of a piston with a connecting rod, the piston comprising a bearing spaced from the inner surface of the piston, said bearing having a transverse opening and having upper and lower portions spaced from each other, the lower portion comprising spaced members movable relatively to each other for varying the diameter of the transverse opening, a flexible member incorporated in the bearing and connecting the lower bearing member with the upper bearing member, and means connecting the lower bearing member for adjusting the diameter of said transverse opening, the connecting rod having a pivot head adapted to enter said opening, said pivot head being movable axially into the opening of the bearing without removing the adjusting means in uniting the connecting rod to the piston.

8. The combination of a piston with a connecting rod, the piston comprising a bearing spaced from the inner surface of the piston, said bearing having a transverse opening and comprising upper and lower portions spaced from each other, the lower portion being divided to provide separate members movable relatively to each other for varying the diameter of the transverse opening, a spring member incorporated in the bearing and connecting the lower bearing member with the upper portion of the bearing, and means adjustably connecting the lower bearing members for varying the diameter of said transverse opening, the connecting rod having a pivot head adapted to enter said transverse opening, said pivot head being integral with the connecting rod and comprising a peripheral bearing surface and an axial web, said web having radial parts leading to its surface for lubricating the lower bearing members, and the upper portion of the bearing having an oil passage therethrough communicating with said transverse opening.

9. The combination of a piston with a connecting rod, the piston comprising a bearing spaced from the inner surface of the piston, said bearing having a transverse opening and comprising upper and lower portions spaced from each other, the lower portion being divided to provide separate members movable relatively to each other for varying the diameter of the opening, a flexible member incorporated in the bearing and connecting the lower bearing members with the upper portion of the bearing, a bridge member connecting the lower bearing member, and means passing through said bridge member and into one of said lower bearing members for varying the distance between said bearing member thereby to adjust the diameter of the transverse opening, the connecting rod having a pivot head adapted to enter said transverse opening.

10. The combination of a piston with a connecting rod, the piston comprising a bearing spaced from the inner surface of the piston, said bearing having a transverse opening and comprising upper and lower portions spaced from each other, the lower portion being divided to provide separate members movable relatively to each other for varying the diameter of the transverse opening, a flexible member incorporated in the bearing and connecting the lower bearing members with the upper portion of the bearing, a bridge connecting the lower bearing members, and means passing through said bridge and into one of said lower bearing members for varying the distance between said lower bearing members, thereby to adjust the diameter of the transverse opening, the connecting rod having a pivot head adapted to enter said opening, and the bridge having a recess in one side whereby the connecting rod may be applied to the piston by moving its pivot head axially into said transverse opening without removing said bridge.

11. The combination of a piston with a connecting rod, the piston comprising a bearing spaced from the inner surface of the piston, said bearing having a transverse opening and comprising upper and lower portions spaced from each other, the lower portion being divided to provide separate members movable relatively to each other for varying the diameter of the transverse opening, a spring member incorporated in the bearing element and connecting the lower bearing member with the upper portion of the bearing, a bridge connecting the under faces of the lower bearing members, one end of the bridge being removably secured to one of said members and the opposite end having an opening therethrough, said opening communicating with a threaded aperture in the other bearing member, and an adjusting screw threading into said aperture, the screw having a conical collar cooperating with said opening to vary the relative longitudinal disposition of the bridge and the latter bearing member, thereby to regulate the distance between said lower bearing members and thereby to adjust the diameter of said transverse opening, the connecting rod having a pivot head adapted to enter said opening.

12. A trunk piston and piston rod and connections providing a universal joint between the piston and rod, said connections comprising a bearing member separable from and bodily movable together with the rod in a direction transverse of the axis of the piston whereby to remove the rod from the piston.

13. In combination with a trunk piston of the kind having a head, a skirt portion, and a bearing beneath the head and within the skirt, said bearing comprising an outer portion integrally fixed to the piston and an inner annulus removable from the outer portion by bodily axial movement transverse to the piston axis, and a connecting rod having a pivot member normally fitting within said removable annulus.

14. The combination of a piston having a journal opening whose axis is transverse to that of the piston, said opening being within a bearing member spaced from the inner surface of the piston head and permanently fixed in position, a connecting rod having an integral part constituting a pivot member, and means interposed between said journal opening and the pivot member of the connecting rod and cooperating therewith to provide a universal joint between the rod and piston.

15. The combination of a piston with a connecting rod, the piston comprising an integral bearing element spaced from the inner surface of the piston head and means forming a universal joint uniting the piston and connecting rod, said means being so constructed and arranged as to permit the connecting rod to be assembled with the piston by movement of the end of the rod axially into the piston and then transversely of the piston.

16. The combination of a piston and connecting rod, the piston having an opening whose axis is transverse to the axis of the piston, the connecting rod having an integral pivot element provided with a spherical outer surface, and a ring removably fitted within the transverse opening in the piston and having an inner spherical surface within which the pivot member of the connecting rod is fitted.

17. The combination of a piston with a connecting rod, the piston rod having a pivot member at one end provided with spherical surfaces, the piston having a bearing member spaced from the inner surface of the piston head and permanently fixed in position and providing a cylindrical journal opening whose axis is transverse to that of the piston, and a ring having a cylindrical outer surface adapted to engage the inner surface of said journal opening and an inner surface of spherical contour embracing the pivot member of the connecting rod.

18. In combination with a trunk piston of the kind having a head, a skirt portion, and a bearing beneath the head and within the skirt, the bearing comprising an axially movable annulus having a spherically curved inner surface, and a connecting rod having a pivot member provided with a spherically curved surface fitting with said annulus.

19. The combination of a piston having a head and a skirt portion with a connecting rod, said piston and connecting rod having cooperating parts constituting a joint uniting the piston and rod, certain of said parts having engaging surfaces of spherical curvature providing universal movement for the rod relative to the piston, the rod being separable from the piston by relative movement of the rod transversely of the piston without removing the cylinder head or withdrawing the piston from the cylinder.

20. A trunk piston for use with a connecting rod provided with an end portion constituting a pivot member, said piston having a head and a skirt portion, a bearing member beneath the head and within the skirt portion, the bearing member being spaced at one side at least from the inner surface of the piston to permit introduction of the pivot member of the rod between the bearing member and such inner surface, and means cooperating with said bearing member and the pivot member of the rod to form a universal connection between the rod and piston.

21. A trunk piston for use with a connecting rod provided with an end portion constituting a pivot member, said piston having a head and a skirt portion, a bearing member beneath the head and within the skirt portion, the bearing member being spaced at one side at least from the inner surface of the piston to permit introduction of the pivot member of the rod between the bearing member and such inner surface, the bearing having an opening therein, and a ring having inner and outer peripheral surfaces, one of which is cylindrical and the other of which is spherical, one of the peripheral surfaces of the ring engaging the opening in the bearing, and the other of said surfaces engaging the pivot member of the rod.

22. A trunk piston for use with a connecting rod provided with an end portion constituting a pivot member, said piston having a head and a skirt portion, a bearing member beneath the head and within the skirt portion, the bearing member being spaced at one side at least from the inner surface of the piston to permit introduction of the pivot member of the rod between the bearing member and such inner surface, the bearing having a cylindrical opening whose axis is transverse to that of the piston, the pivot member of the rod having a spherically curved peripheral surface, a ring fitting within said cylindrical opening, and means preventing the ring from turning in the opening while permitting it to move axially therein, the ring having a spherically curved inner surface cooperating with the pivot member of the rod to form a universal joint.

23. A trunk piston for use with a connecting rod provided with an end portion constituting a pivot member, said piston having a head and a skirt portion, a bearing member beneath the head and within the skirt portion, the bearing member being spaced at one side at least from the inner surface of the piston to permit introduction of the pivot member of the rod between the bearing member and such inner surface, the bearing having a cylindrical opening whose axis is transverse to that of the piston, the pivot member of the rod having a spherical peripheral surface, and a removable ring having a peripheral inner surface of spherical curvature embracing the pivot member of the rod, said ring having an outer peripheral surface adapted to enter the cylindrical opening in the bearing by movement axially of said opening.

24. A trunk piston for use with a connecting rod provided with an end portion constituting a pivot member, said piston having a head and a skirt portion, a bearing member beneath the head and within the skirt portion, the bearing member being spaced at one side at least from the inner surface of the piston to permit introduction of the pivot member of the rod between the bearing member and such inner surface, the bearing having a cylindrical opening whose axis is transverse to that of the piston, and a ring having an outer peripheral surface adapted to fit in the bearing opening and to be entered therein by movement axially of said opening, said ring being removable at will from the opening and having a spherical inner surface, the pivot member being of disk form having a spherical peripheral surface adapted to fit within the ring, the ring having opposed transverse slots to permit entry of the pivot member of the rod within the ring.

25. In combination with a trunk piston of the kind having a head, a skirt portion, and an annular bearing member beneath the head and within the skirt, the bearing having an oil-collecting reservoir and an oil passage leading therefrom to its inner surface, a piston rod having a pivot member at its end adapted to fit within the annular bearing member, the rod having an oil channel communicating with said oil reservoir, and passages leading from said channel to the peripheral surface of the pivot member.

26. The combination of a piston with a connecting rod, the piston comprising a bearing spaced from the inner surface of the piston, said bearing having a transverse opening and comprising upper and lower portions spaced from each other, the lower portion being divided to provide separate members movable relatively to each other for varying the diameter of the transverse opening, a flexible member incorporated in the bearing and connecting the lower portion of the bearing with the upper portion thereof, a ring fitting within the opening in the bearing, the inner surface of said ring being arcuate transversely, and means connecting said lower bearing members for adjusting the diameter of said journal opening, the connecting rod having a pivot head provided with a bearing surface of a spherical contour adapted to fit within said ring to allow universal movement of the connecting rod.

27. The combination of a piston with a connecting rod, the piston comprising a bearing spaced from the inner surface of the piston, said bearing having a transverse opening and comprising upper and lower portions spaced from each other, the lower portion being divided to provide separate members movable relatively to each other for varying the diameter of the opening, a spring member incorporated in the bearing and connecting the lower bearing members with the upper bearing member, a ring fitting within the said transverse opening, the inner surface of said ring being arcuate transversely, and means connecting said lower bearing members for adjusting the diameter of said transverse opening, the connecting rod having a pivot head provided with a bearing surface of spherical curvature adapted to fit within said ring to allow universal movement of the connecting rod, said ring being movable axially in said bearing and being splined to the upper portion of the bearing, so that the attached connecting rod may move bodily in a direction axial to the bearing.

28. A piston of the class described comprising a bearing spaced from the inner surface of the piston, said bearing being generally disk-like in character, and having an upper portion, a pair of separated lower members spaced from the upper portion, and a spring member incorporated in the bearing, portions of said spring member being disposed at opposite sides of the bearing and connecting said lower bearing members to the upper portion of the bearing so that said lower members may be moved relatively to each other to vary the space therebetween, the inner surfaces of said upper portion of the bearing and of said lower members constituting segments of the wall of a cylindrical opening, and an inner ring fitting within said opening, the inner surface of said ring being arcuate transversely so that a connecting rod having a pivot head provided with a bearing surface of spherical curvature may be fitted within said journal opening.

29. A piston of the class described comprising a bearing spaced from the inner surface of the piston, said bearing being generally disk-like in character and comprising an upper portion and a pair of separated lower members spaced from the upper portion, and a spring element incorporated in the bearing, portions of said spring element being disposed at opposite sides of the bearing and connecting said lower members to the upper portion of the bearing so that said lower members may be moved relatively to each other to vary the space therebetween, the inner surfaces of said upper portion of the bearing and of said lower members constituting segments of the wall of a cylindrical opening, and a resilient inner ring slidable axially into said opening and being splined to the upper portion of the bearing, the inner surface of said ring being arcuate in cross-section thereby to provide a journal opening for receiving the spherically-curved pivot head of a connecting rod.

Signed by me at Boston, Massachusetts, this 19 day of May 1930.

ALLAN E. REID.